Patented Mar. 27, 1928.

1,664,123

UNITED STATES PATENT OFFICE.

WINFORD LEE LEWIS, OF EVANSTON, ILLINOIS, ASSIGNOR, BY MESNE ASSIGNMENTS, TO PARKE, DAVIS & COMPANY, OF DETROIT, MICHIGAN, A CORPORATION OF MICHIGAN.

PRODUCTION OF DERIVATIVES OF ARSANILIC ACIDS.

No Drawing.   Application filed March 14, 1924. Serial No. 699,313.

This invention relates to improvements in the production of derivatives of arsanilic acids and will be fully understood from the following description thereof.

In accordance with the invention an arsanilic acid (or suitable derivative thereof) is caused to react with a compound containing an active residue of a polyhydric alcohol, such as the oxides, monohalides or dihalides of such alcohols. In carrying out the reaction the arsanilic acid is treated with the calculated equivalent amount of a suitable compound containing an active polyhydric alcohol residue, as described under suitable conditions to bring about reaction. A substituted arsanilic acid is thereby produced in which at least one hydrogen atom of the amino-group of the arsanilic acid is replaced by a hydrocarbon radical or grouping containing at least one hydroxyl group.

The following is an illustration of a reaction embodying my invention in a simple form.

A suitable quantity of arsanilic acid is dissolved in the calculated amount of dilute sodium hydroxide solution (say normal to twice normal) containing an equivalent molecular quantity of the alkali. The solution of the monosodium salt is then treated with at least an equivalent molecular quantity of ethylene oxide after having been cooled to 12° C. or lower. Preferably about 1½ molar equivalents of the ethylene oxide are employed. The reaction proceeds at room temperature, preferably below 30° C. and requires from 24 to 48 hours, and in some cases longer for completion. The reaction may be represented as follows:

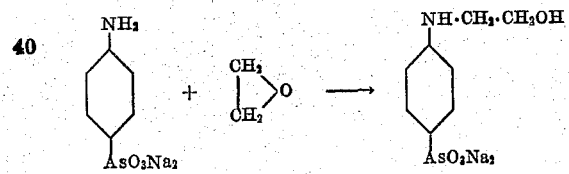

The alcohol substituted arsanilic acid may be separated by precipitation upon acidifying the reaction mixture, the precipitated compound being purified in any suitable manner; for example, by recrystallization from hot water. It may be dried at a temperature not in excess of 40° C. The compound is more fully described in the copending application of C. S. Hamilton, Serial No. 699,891, filed of even date herewith.

In place of ethylene oxide I may employ ethylene chlorhydrin, ethylene bromhydrin or a similar compound, the reaction proceeding as follows:

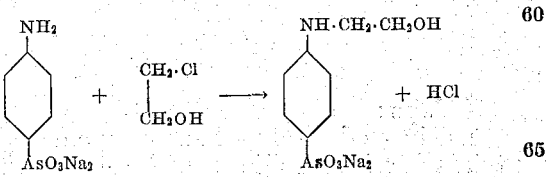

In this case the reaction is preferably carried out by boiling the arsanilic acid, dissolved as above described, with an excess of the chlorhydrin (or similar compound) under a reflux condenser for, say 4 to 5 hours.

In a similar manner I have reacted upon arsanilic acids and their derivatives with other compounds containing a reactive residue of a polyhydric alcohol; for example, by reaction on an arsanilic acid with epichlorhydrin, I have found the reaction to proceed as follows:

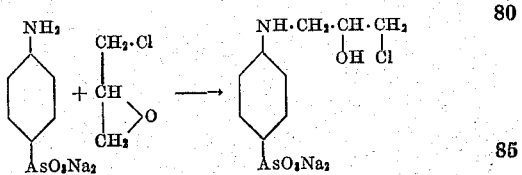

A similar reaction which may be carried out is indicated as follows:

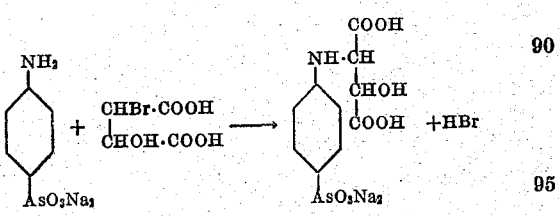

The resulting compound in the case preceding the last contains in the group substituted in the amino group of the arsanilic acid a reactive polyhydric alcohol residue of the halohydrin type and may again be combined with an arsanilic acid, forming a compound containing a plurality of arsanilic acid residues such as

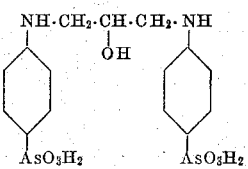

In the above described reactions the p-arsanilic acid has been described, inasmuch as its conduct is typical of the various arsanilic acids and their derivatives. The reaction may also be carried out with other arsanilic acids having the amino group in other positions and with their descriptions; for example, 3.4 diamino-phenyl arsonic acid, forming a resulting compound such as

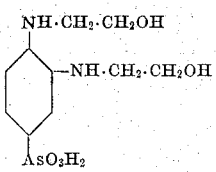

I claim:

1. The method of forming compounds containing an arsanilic acid group with a radical containing a hydroxyl group substituted in the amino group which comprises reacting upon an arsanilic acid in aqueous caustic solution with a compound containing a reactive polyhydric alcohol residue.

2. The method of forming compounds containing an arsanilic acid group with a radical containing a hydroxyl grouping substituted in the amino group which comprises reacting upon an arsanilic acid with a compound containing the group

3. The method of forming an arsanilic acid derivative having a radical containing a hydroxyl group substituted in the amino group of said acid which comprises reacting upon an arsanilic acid in aqueous alkaline solutions with a compound containing an ethylene oxide group without applying heat thereto.

4. The method of forming a p-arsanilic acid having a hydroxyethyl group substituted in the amino group of the acid which comprises cooling an aqueous alkaline solution of p-arsanilic acid, adding ethylene oxide thereto, and causing the reaction to take place without applying heat.

WINFORD LEE LEWIS.